No. 776,977. PATENTED DEC. 6, 1904.
C. WICKSTEED.
FLEXIBLE SHAFT.
APPLICATION FILED MAY 23, 1904.
NO MODEL. 2 SHEETS—SHEET 2.
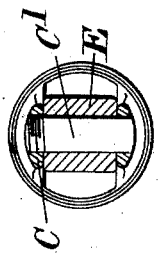
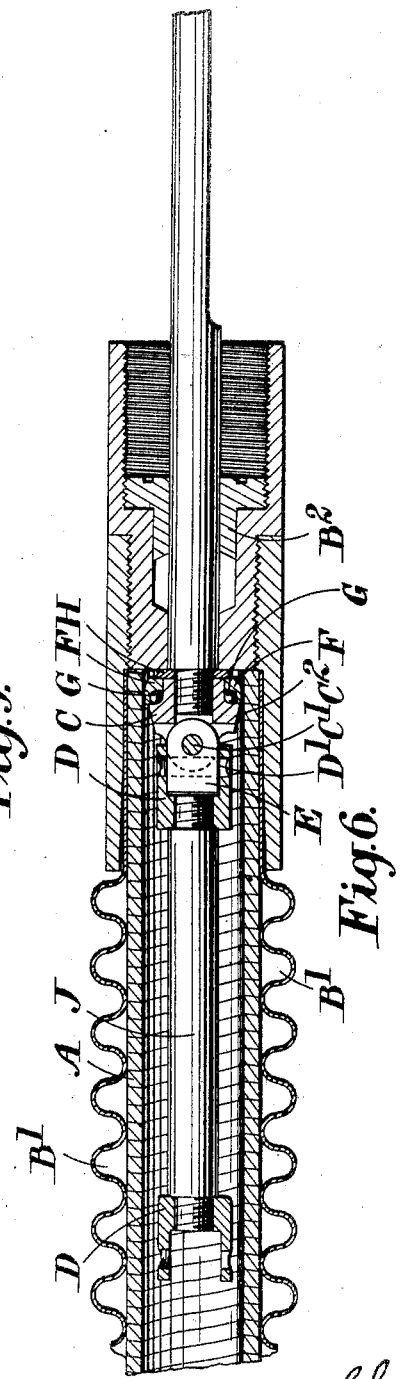
Witnesses:
Thomas Durant
M. D. Church
Inventor:
Charles Wicksteed,
By Church & Church
his Attys No. 776,977.

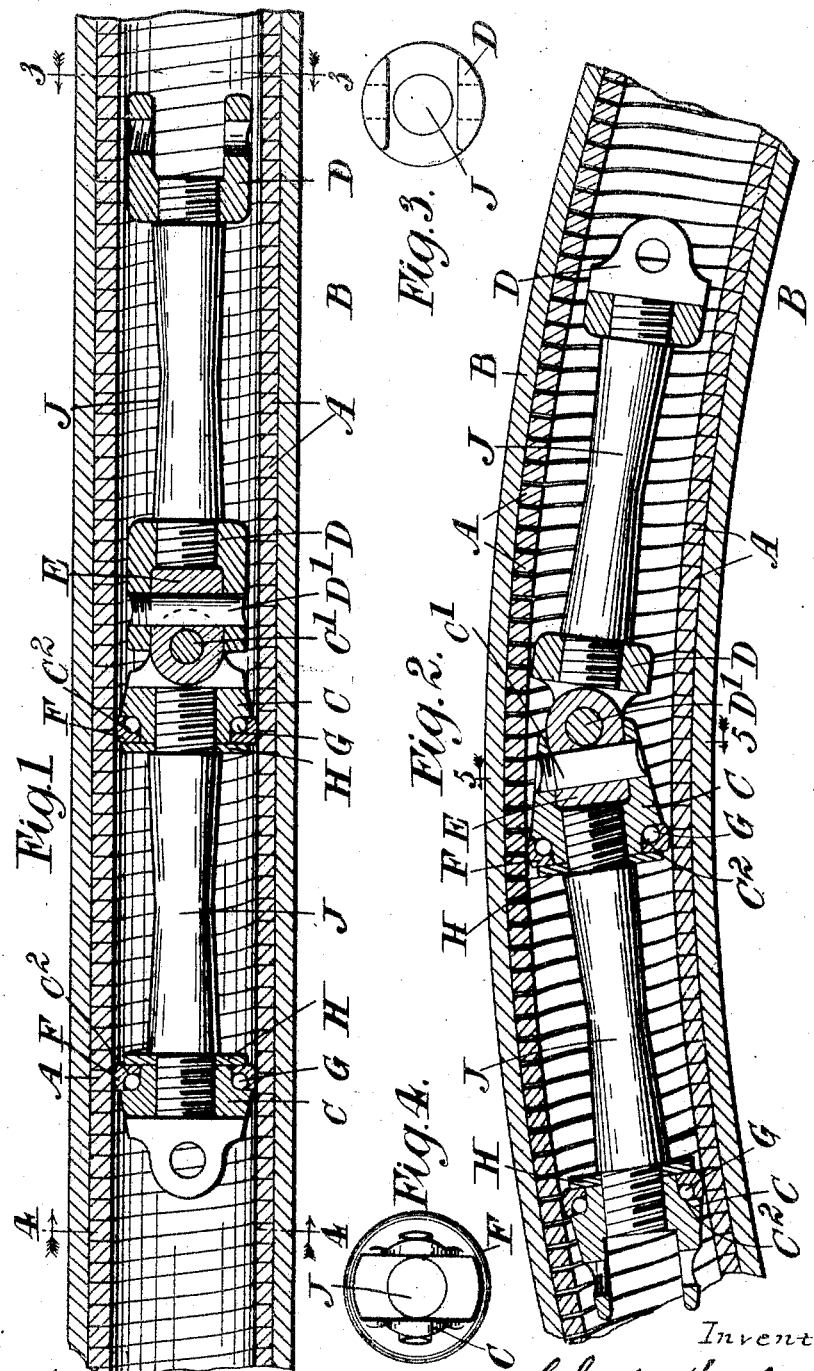

Patented December 6, 1904.

UNITED STATES PATENT OFFICE.

CHARLES WICKSTEED, OF KETTERING, ENGLAND.

FLEXIBLE SHAFT.

SPECIFICATION forming part of Letters Patent No. 776,977, dated December 6, 1904.

Application filed May 23, 1904. Serial No. 209,357. (No model.)

*To all whom it may concern:*

Be it known that I, CHARLES WICKSTEED, a subject of the King of England, residing at Kettering, in the county of Northampton, England, have invented certain new and useful Improvements in or Relating to Flexible Shafts, of which the following is a specification.

This invention relates to flexible shafts, its object being the construction of efficient and durable shafts which in operation have little friction. This is accomplished according to this invention by an improved construction of the shaft and by the provision of a flexible casing or cover, which can be filled with oil, so that the parts rotate in a flexible oil-bath.

According to this invention a flexible tube is employed, preferably in the form of a closely-wound spiral of wire of square or rectangular cross-section. Within this tube is a series of universal or double-motion joints, adjacent joints being connected by a shaft or spindle of sufficient length to prevent buckling. Ball-bearings are provided between the rotary parts and the tube, so that when the shaft is curved there is little friction, the inner parts rotating within the ball-bearing and being kept out of contact with the inclosing tube. The ball-bearing is conveniently formed on one of the members forming each joint. For instance, the member may have a recess and a loose flanged ring or cap be arranged to inclose the balls and form with the recess a ball-race, this ring being held in place by a collar or the like.

In the accompanying drawings, which illustrate, by way of example, one construction of flexible shaft according to this invention, Figures 1 and 2 are sectional elevations taken approximately at right angles to each other, the shaft in Fig. 2 being shown bent. Figs. 3 and 4 are end views showing portions of the joint looking in the direction of the arrows 3 and 4, respectively, in Fig. 1. Fig. 5 is a section through the joint, taken on the line 5 5 of Fig. 2. Fig. 6 is a sectional elevation of a preferred form of flexible shaft having a flexible casing serving as an oil-retainer.

Like letters indicate like parts throughout the drawings.

With reference first to Figs. 1 and 2, A is a flexible tube formed of a closely-wound spiral of square-section wire and provided with a protective covering B—say of leather. The joint is formed of two fork-like members C and D, pivoted to a common block E by screwed pins C' and D'. The axes of these pins are placed as close together as possible in order that the joint formed shall approximate to a universal joint. The fork C is provided with a recess C² and a ring F, which together form a ball-race for friction-balls G. The ring F is kept in position by a washer H, which slips over the screwed portion of a shaft or spindle J, connecting adjacent joints. The length of the spindle J is such that it prevents any risk of kinking or buckling of the flexible tube. The ring F is of larger diameter than the forks C and D, so that when the shaft is bent—as, for example, in Fig. 2—the joint can rotate freely in the ball-bearing without either of its members coming into contact with the inside of the flexible tube A. Any bending of the tube simply acts to grip the ring F and does not set up friction between the rotating parts and the tube, as would otherwise be the case.

Fig. 3 is an end view of the fork D, as shown at the left-hand side of Fig. 1, and Fig. 4 is a similar view of the fork C on the right-hand side of Fig. 1. Fig. 5 shows the fork C and block E in section through the pin C'.

Referring to Fig. 6, the flexible tube A may be rendered oil-tight by providing it with a corrugated metallic cover B' and suitable glands or stuffing-boxes B² placed at the end, so that the tube can be filled with oil in which the rotating parts may run.

What I claim as my invention, and desire to secure by Letters Patent, is—

1. In a flexible shaft the combination of a flexible tube formed of a closely-wound spiral of wire a plurality of double-motion joints therein each comprising two fork-like members pivoted to a common member by pivots at right angles to one another and in close proximity, a ball-bearing between the tube and the rotatable element within it, short spindles connecting the adjacent joints and an oil-tight protective cover of flexible material.

2. In a flexible shaft the combination with a flexible tube formed of a closely-wound spiral of rectangular-section wire, a double-motion joint therein comprising two opposite fork-like members, a central block between them, pivot-pins at right angles to one another between the forks and the block, the axes of said pins being in close proximity, and a ball-bearing between the tube and the rotatable element within it.

3. In a flexible shaft the combination of a flexible tube formed of a closely-wound spiral of rectangular-section wire, a double-motion joint therein comprising two opposite fork-like members, a central block between them, pivot-pins at right angles to one another between the forks and the block, there being a recess in one fork, a loose ring forming with the recess a ball-race, a set of balls therein and a washer secured to the fork and retaining the ring, said ring being of larger diameter than the forks.

4. In a flexible shaft the combination of a flexible tube formed of a closely-wound spiral of rectangular-section wire, a plurality of double-motion joints therein each comprising two opposite fork-like members, a central block between them, pivot-pins at right angles to one another between the forks and the block, there being a recess in one fork, a loose ring forming with the recess a ball-race, a set of balls therein, a washer secured to the fork and retaining the ring and spindles connecting the members in pairs and of sufficient length to prevent buckling.

5. In a flexible shaft the combination of a flexible tube formed of a closely-wound spiral of rectangular-section wire, a plurality of double-motion joints therein each comprising two opposite fork-like members, a central block between them, pivot-pins at right angles to one another between the forks and the block, there being a recess in one fork, a loose ring forming with the recess a ball-race, a set of balls therein, a washer secured to the fork and retaining the ring, spindles connecting the members in pairs and of sufficient length to prevent buckling and an oil-tight corrugated metallic cover for the tube.

6. In a flexible shaft the combination of a flexible tube formed of a closely-wound spiral of rectangular-section wire, a plurality of double-motion joints therein each comprising two opposite fork-like members, a central block between them, pivot-pins at right angles to one another, between the forks and the block, there being a recess in one fork, a loose ring forming with the recess a ball-race, a set of balls therein, a washer secured to the fork and retaining the ring spindles connecting the members in pairs and of sufficient length to prevent buckling, a corrugated metallic cover for the tube to contain oil and stuffing-boxes at the ends of the cover.

In testimony whereof I have signed my name to this specification in the presence of two subscribing witnesses.

CHARLES WICKSTEED.

Witnesses:
   A. M. TROUP,
   H. C. TIMMS.